(12) United States Patent
Starr et al.

(10) Patent No.: US 12,067,392 B2
(45) Date of Patent: Aug. 20, 2024

(54) PROVIDING ACCESS TO HISTORICAL METADATA FOR SOFTWARE REPOSITORIES

(71) Applicant: RED HAT, INC., Raleigh, NC (US)

(72) Inventors: Robert Starr, Hartford, CT (US); Pierre-Yves Chibon, Paris (FR)

(73) Assignee: Red Hat, Inc., Raleigh, NC (US)

( * ) Notice: Subject to any disclaimer, the term of this patent is extended or adjusted under 35 U.S.C. 154(b) by 69 days.

(21) Appl. No.: 17/826,918

(22) Filed: May 27, 2022

(65) Prior Publication Data

US 2023/0385055 A1    Nov. 30, 2023

(51) Int. Cl.
*G06F 8/71* (2018.01)
*G06F 8/41* (2018.01)
*G06F 8/60* (2018.01)

(52) U.S. Cl.
CPC .............. *G06F 8/71* (2013.01); *G06F 8/447* (2013.01); *G06F 8/60* (2013.01)

(58) Field of Classification Search
CPC .............. G06F 8/447; G06F 8/60; G06F 8/71
See application file for complete search history.

(56) References Cited

U.S. PATENT DOCUMENTS

| | | | | |
|---|---|---|---|---|
| 7,822,717 B2* | 10/2010 | Kapoor | ............... | G06F 11/1469 707/680 |
| 8,229,579 B2* | 7/2012 | Eldridge | ............... | G05B 15/02 707/999.203 |
| 8,347,263 B1 | 1/2013 | Offer | | |
| 8,453,145 B1* | 5/2013 | Naik | ............... | G06F 3/0619 718/1 |
| 8,863,114 B2 | 10/2014 | Shah | | |
| 9,292,261 B1* | 3/2016 | Bouldin | ............... | G06Q 10/101 |
| 10,176,048 B2* | 1/2019 | Jaquette | ............... | G06F 11/1448 |
| 10,255,137 B1* | 4/2019 | Panidis | ............... | G06F 11/1469 |
| 10,430,284 B2* | 10/2019 | Jain | ............... | G06F 11/1451 |
| 10,534,624 B2 | 1/2020 | Antill et al. | | |
| 10,637,915 B1* | 4/2020 | Ward | ............... | H04L 67/1008 |
| 11,281,543 B2* | 3/2022 | Wilcock | ............... | G06F 11/1456 |

(Continued)

OTHER PUBLICATIONS

"Introduction to RPM Packaging", SUSE Linux Enterprise, openSUSE, pp. 1-30, 2021, https://documentation.suse.com/sbp/all/html/SBP-RPM-Packaging/index.html.

(Continued)

*Primary Examiner* — Douglas M Slachta
(74) *Attorney, Agent, or Firm* — Kilpatrick Townsend & Stockton LLP

(57) ABSTRACT

Software builds can be constructed according to previously recorded software repository metadata. For example, a computing device can record, by a first application programming interface, metadata for a software repository at various times. The metadata can include a timestamp indicating a time that the metadata was recorded. The computing device can receive a metadata request for metadata for the software repository at a particular time. The first application programming interface can determine a latest timestamp that precedes the particular time. The computing device can provide the client device with access to the metadata associated with the latest timestamp for use in producing a software build having characteristics of the metadata at the particular time.

20 Claims, 3 Drawing Sheets

(56) References Cited

U.S. PATENT DOCUMENTS

| | | | |
|---|---|---|---|
| 2004/0015860 A1* | 1/2004 | Craft | G06F 11/362 |
| | | | 717/122 |
| 2004/0186968 A1* | 9/2004 | Factor | G06F 3/065 |
| | | | 711/112 |
| 2007/0011137 A1* | 1/2007 | Kodama | G06F 16/128 |
| 2007/0055833 A1* | 3/2007 | Vu | G06F 11/1469 |
| | | | 711/162 |
| 2007/0271552 A1 | 11/2007 | Pulley | |
| 2010/0169592 A1* | 7/2010 | Atluri | G06F 11/1471 |
| | | | 711/E12.001 |
| 2011/0099147 A1* | 4/2011 | McAlister | G06F 11/2076 |
| | | | 707/639 |
| 2012/0254119 A1* | 10/2012 | Kumarasamy | G06F 11/1464 |
| | | | 707/646 |
| 2012/0284232 A1* | 11/2012 | Fiske | G06F 11/1448 |
| | | | 707/646 |
| 2013/0185701 A1* | 7/2013 | Martick | G06F 8/71 |
| | | | 717/120 |
| 2013/0227526 A1* | 8/2013 | Imrey | G06Q 10/10 |
| | | | 717/122 |
| 2013/0262396 A1* | 10/2013 | Kripalani | G06F 8/61 |
| | | | 707/674 |
| 2014/0164449 A1* | 6/2014 | Kim | G06F 9/5005 |
| | | | 707/827 |
| 2018/0052858 A1* | 2/2018 | Soncodi | G06F 16/13 |
| 2018/0189336 A1* | 7/2018 | McHugh | G06F 16/172 |
| 2023/0229627 A1* | 7/2023 | Singh | G06F 11/1446 |
| | | | 707/826 |

OTHER PUBLICATIONS

"Oracle Linux 8, Managing Software on Oracle Linux", Oracle, pp. 1-82, 2021.

"Chapter 3. Packaging Software", Red Hat, Inc., pp. 1-35, 2022, https://access.redhat.com/documentation/en-us/red_hat_enterprise_linux/8/html/packaging_and_distributing_software/packaging-software_packaging-and-distributing-software.

"Repositories and Sources", RStudio, pp. 1-18, 2021, https://docs.rstudio.com/rspm/1.2.0/admin/repositories/.

Miller, "Using the RPM Package Manager for (LA) TEX Packages", TUGboat, vol. 26 (2005), No. 1, pp. 1-12.

* cited by examiner

PROVIDING ACCESS TO HISTORICAL METADATA FOR SOFTWARE REPOSITORIES

TECHNICAL FIELD

The present disclosure relates generally to software repositories. More specifically, but not by way of limitation, this disclosure relates to providing access to historical metadata in software repositories.

BACKGROUND

It has become commonplace for developers to continue to develop and provide updates for (e.g., new versions of) software over time. For example, developers may provide updates over time that add features to the software or remove existing features from the software. New software may also be created that has similar functionality to older software. A user may wish to replace the existing software in a computing environment with such updates or new software. The software can be built and updated using software packages stored in a software repository. The software repository can additionally include metadata about the software packages installed, the order of installation, dependencies used, environmental variables, and any other details regarding the software build. In some cases, the software repository may include metadata regarding package manager files that store installation packages. One example of such package manager files includes Red Hat™ Package Manager (RPM) files for storing installation packages on Linux operating systems.

DETAILED DESCRIPTION

Figure 1:
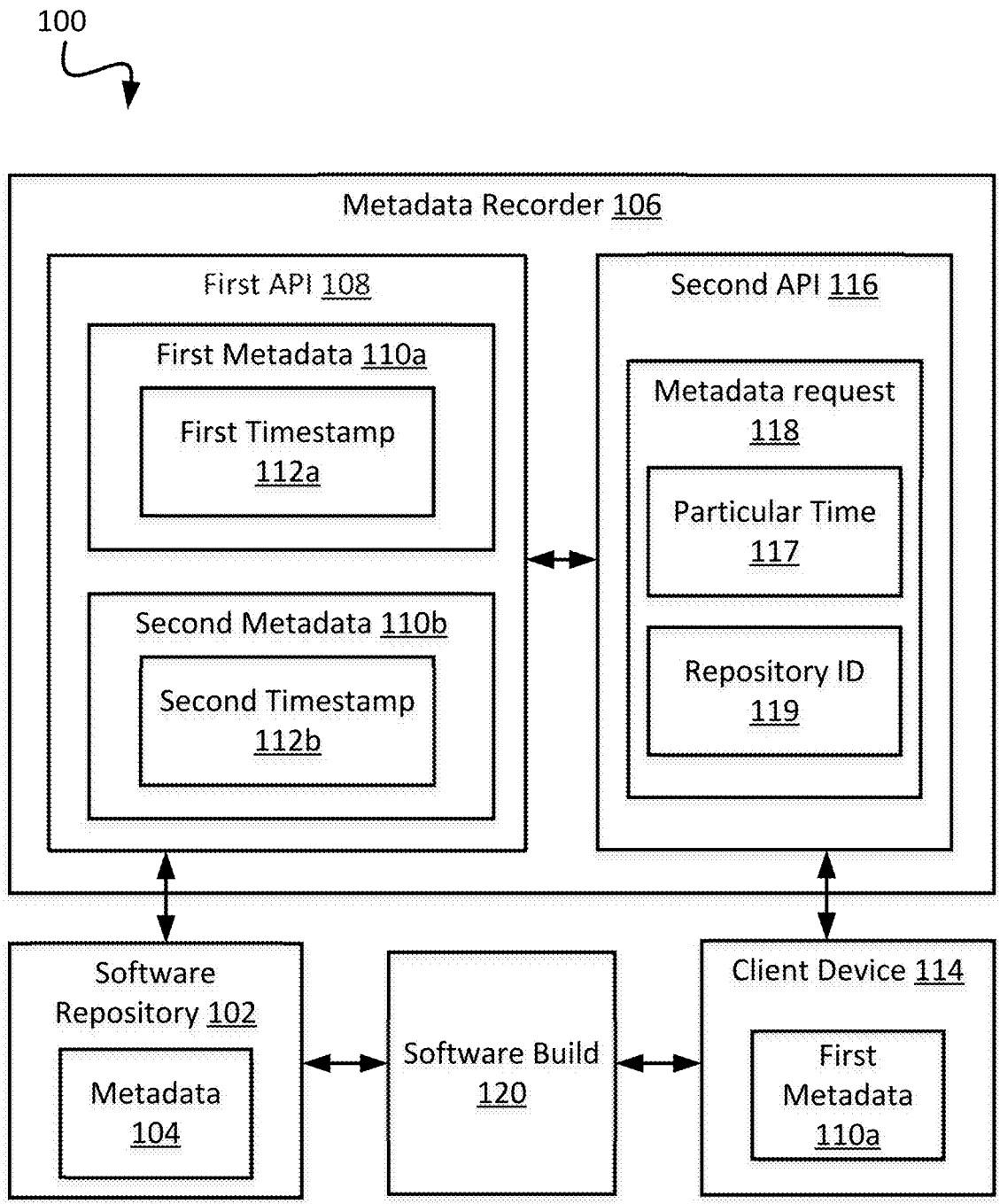
FIG. 1 is a block diagram of an example of a system for providing access to historical metadata for a software repository according to some aspects of the present disclosure.

There are a number of industries and applications that may require the ability to access necessary information for reproducing a software build, especially at a particular point in time. This requirement may be driven by audits, quality assurance testing, or root cause analysis to determine a source of an issue. In some cases, build systems may not keep records of previous software builds. And, while some build systems may keep copies of previous software builds, it may be difficult or impossible for client devices to access the build system to retrieve such copies. Client devices with limited or no access to the build system may be unable to determine, for example, the root cause of an issue with a software build at a particular point in time. Additionally, systems that do store copies of previous software builds may not record copies at frequent enough intervals to allow a client device to exactly replicate a version of the software build at a particular time.

Some examples of the present disclosure can overcome one or more of the abovementioned problems via a metadata recorder that can periodically record metadata for package manager files of a software repository. The metadata may include a timestamp indicating a time of recording. Client devices may transmit metadata requests for metadata indicating package manager files used at a particular time, and the metadata recorder can determine and transmit metadata associated with the latest timestamp that precedes the particular time. The metadata recorded at various times can therefore be accessible to client devices that wish to exactly recreate software builds at particular times. In some examples, the metadata may be recorded at predefined intervals. Additionally or alternatively, the metadata may be recorded in response to a change to the metadata. In this way, historical metadata for each version of a software build over time may be accessible to a client device.

In one particular example, a software repository may store package manager files that include metadata describing the contents of the package manager files. One example of a package manager file is a Red Hat™ Package Manager (RPM) file. At predefined intervals, such as once per day, a metadata recorder may record the metadata for the software repository. The recorded metadata may include or may be associated with (such as in a table) a timestamp indicating the time of recording. An incident may occur in a heavily regulated industry, such as the automotive industry, that may require the exact software build conditions and state from a particular time of the incident, such as several months ago. A client device may transmit a metadata request for the particular time to the metadata recorder.

The metadata recorder may determine a recorded metadata associated with a timestamp that corresponds to the particular time. In some examples, the particular time may correspond exactly to a particular timestamp, and the metadata recorder may provide the client device with access to the metadata associated with the particular timestamp. In other examples, the timestamp may not correspond exactly to a particular timestamp. Therefore, the metadata recorder may determine a latest or most recent metadata that was recorded before the particular time. For example, if a first metadata was recorded at a first timestamp of Feb. 28, 2022 at 4:54 PM and a second metadata was recorded at a second timestamp of Mar. 1, 2022 at 4:54 PM, and the incident occurred a particular time of Feb. 28, 2022 at 5:00 PM, the metadata recorder may determine that the client device is requesting access to the metadata recorded on Feb. 28, 2022 at 4:54 PM. The metadata recorder may provide the metadata with the timestamp corresponding to the particular time of the incident to the client device. In some examples, the client device may automatically generate a software build from RPM files determined from the metadata to replicate the exact software build in use at the time of the incident.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for providing access to historical metadata 110 for a software repository 102 according to some aspects of the present disclosure. The system 100 can include a software repository 102, a metadata recorder 106, a client device 114, and a software build 120 associated with the software repository 102. Examples of the client device 114 can include a server, a laptop computer, a desktop computer, a phone, or any combination of these.

The software repository 102 can include metadata 104 associated with package manager files, such as RPM files. As the package manager files in the software repository 102 are updated, such as in response to a change to the software build 120, the metadata 104 may be updated to reflect the updates. The metadata recorder 106 can include a first application programming interface (API) 108 and a second API 116. The metadata recorder 106 can execute the first API 108 to intermittently record snapshots of the metadata 104 in the software repository 102. The metadata recorder 106 can thus store recorded metadata 110a-b captured at various times. The recorded metadata 110a-b can include or can be associated with a timestamp 122a-b that indicates a time of recording.

In some examples, the recorded metadata 110a-b can be stored in a relational database, which may be located within the metadata recorder 106 or may be located elsewhere in the system 100. For example, such a relational database may include a table with the first metadata 110a associated with the first timestamp 112a, and the second metadata 110b associated with the second timestamp 112b. In other examples, the metadata 110a-b and associated timestamps 112a-b can be stored in a Git repository. Alternatively or additionally, the metadata 110a-b and timestamp can be saved as objects in a bucket.

In some examples, the first API 108 may record metadata 110 at predefined intervals, such as once per week. The predefined intervals may depend on the frequency of updates to the software repository 102. For example, if the software repository 102 is regularly updated on Mondays at 1:00 PM, the first API 108 can record metadata 110 once a week on Mondays at 1:05 PM. Additionally or alternatively, the first API 108 may record the metadata 110 in response to a change to the software repository 102. For example, the first API 108 may periodically, such as once per day, determine if the metadata 104 in the software repository 102 has changed by determining changes to the contents of headers for the metadata 104. If the metadata 104 has changed, such as due to a change to the software build 120, the first API 108 may then record a snapshot of the metadata 104. In another example, a change to the software repository 102 may automatically trigger the first API 108 to record a snapshot of the metadata 104 in the software repository 102. In some examples, the first API 108 may record a snapshot of the metadata 104 in response to receiving a request from the client device 114 to record the metadata 104.

A client device 114 may send a metadata request 118 to the second API 116. The metadata request 118 may be a request for the metadata 104 in the software repository 102 at a particular time 117. The second API 116 can transmit the metadata request 118 to the first API 108. The first API 108 can determine an appropriate metadata 110 based on the metadata request 118. The first API 108 may determine which metadata 110a-b fulfills the metadata request 118 by determining the latest metadata 110 that was recorded before or at the particular time 117. For example, the metadata request 118 may include a particular time 117 that occurred after the first metadata 110a was recorded, but before the second metadata 110b was recorded. Therefore, the first API 108 may determine that the first metadata 110a with the first timestamp 112a fulfills the metadata request 118. The first API 108 can transmit the first metadata 110a to the second API 116. The second API 116 may then transmit the first metadata 110a to the client device 114. The client device 114 may use the first metadata 110a to recreate the software build 120 to its exact specifications at the first timestamp 112a. In this way, the client device 114 may access or recreate historical versions of the metadata 104 in the software repository 102, regardless of the current state of the software repository 102 or the software build 120.

In some examples, the client device 114 may send the metadata request 118 as part of a process or an automated build, such as a continuous integration/continuous deployment (CI/CD) build. For example, in response to receiving the metadata request 118 and determining that the first metadata 110a recorded at the first timestamp 112a fulfills the metadata request 118, the metadata recorder 106 may automatically build or cause a version of the software build 120 to be built using the first metadata 110a. For example, the metadata recorder 106 may cause the previous version of the software build 120 at the particular time 117 in the metadata request 118 to be built on the client device 114 or on another computing device. This may allow the client device 114 to perform quality assurance testing for the software build 120 using previous versions of the metadata 104, without interacting with the current software build 120.

In some cases, the system 100 may include multiple software repositories 102, which may be associated with multiple software builds 120. In such cases, each software repository 102 may be associated with a particular repository identification 119. The first API 108 may store snapshots of the metadata 104 in each software repository 102 in a separate database or bucket. Additionally, the metadata request 118 received from the client device 114 may include a repository identification 119 to identify a particular software repository 102. The first API 108 may determine the metadata 110 and timestamp 112 associated with the metadata request 118 by first determining which database or bucket to search in using the repository identification 119.

Although FIG. 1 shows a certain number and arrangement of components, this is intended to be illustrative and non-limiting. Other examples may include more components, fewer components, different components, or a different arrangement of components shown in FIG. 1. For instance, the software build 120 may be part of the metadata recorder 106, the client device 114, or a separate device. Although two metadata 110a-b are recorded by the first API 108, any number of metadata 110 may be recorded. Additionally, the system 100 may include any number of software repositories 102 or client devices 114. Any suitable arrangement of the depicted components is contemplated herein.

Figure 2:
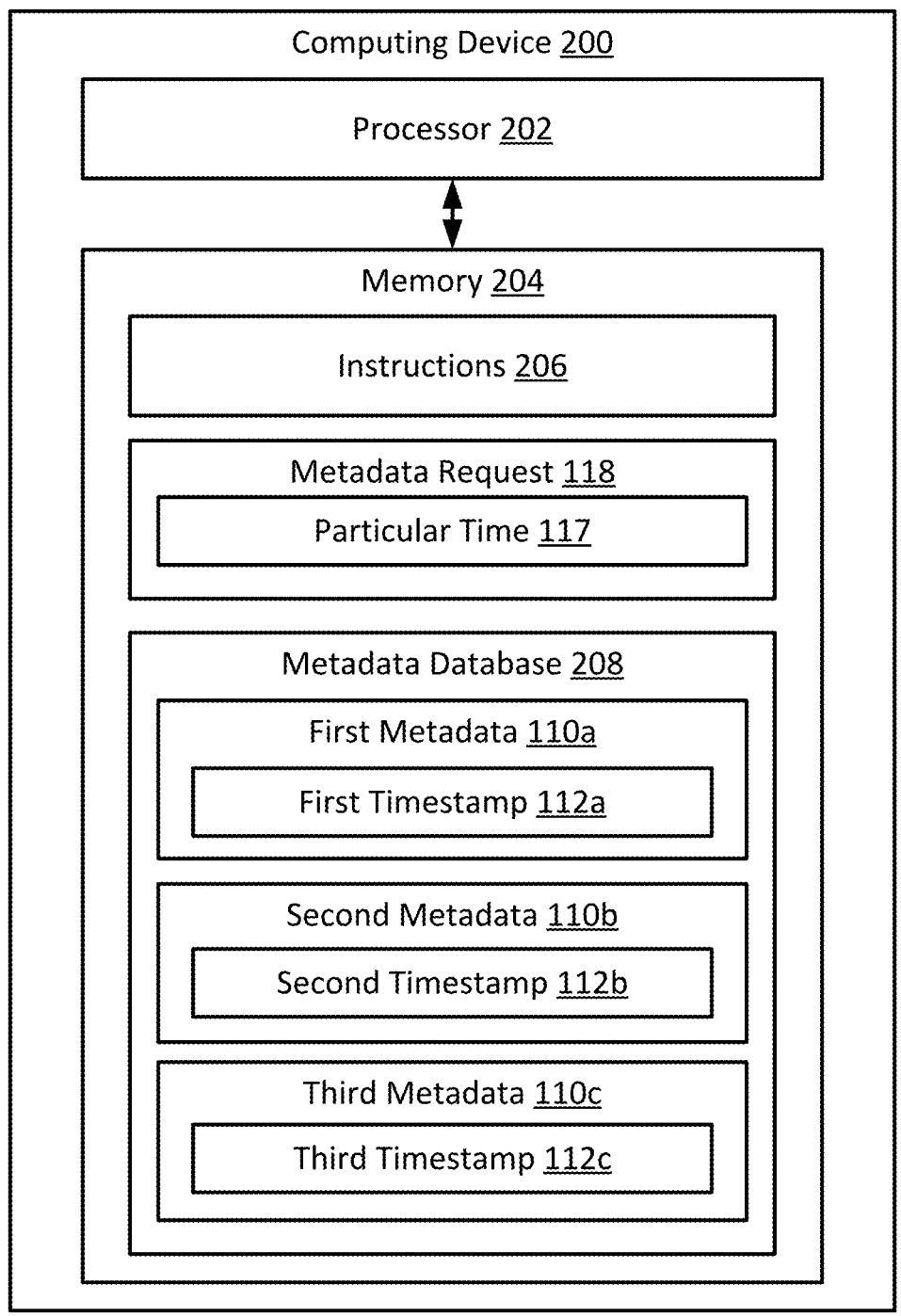
FIG. 2 is a block diagram of a computing device for providing access to historical metadata for a software repository according to some aspects of the present disclosure.

FIG. 2 is a block diagram of a computing device 200 for providing access to historical metadata 110 for a software repository 102 according to some aspects of the present disclosure. The computing device 200 can include a processor 202 communicatively coupled to a memory 204.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. In some examples, the instructions 206 can include processor-specific instructions generated by a compiler or an interpreter from code written in any suitable computer-programming language, such as C, C++, C #, etc. The instructions 206 can be, for example, program code for the metadata recorder 106 of FIG. 1.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. In some examples, at least some of the memory can include a medium from which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

In some examples, the memory 204 can include a metadata database 208 for storing metadata 110 at various times. The metadata database 208 may be a relational database, a Git database, or any other database. The metadata database 208 can include a first metadata 110a recorded at a first timestamp 112a, a second metadata 110b recorded at a second timestamp 112b, and a third metadata 110c recorded at a second timestamp 113c. In some examples, some or all of the metadata 110 may be stored in separate metadata databases 208. For example, a processor 202 recording metadata from three separate software repositories 120 may store each metadata 110 in a separate metadata database 208.

The computing device 200 may receive a metadata request 118 from a client device, such as the client device 114 of FIG. 1. The metadata request 118 may request the metadata for the software repository 102 a particular time 207. In some examples, the instructions 206 may be executable by the processor 202 for causing the processor 202 to determine a metadata 110 in the metadata database 208 that has a timestamp 112 at or before the particular time 117 included in the metadata request 118. The processor 202 may additionally provide the client device 114 access to the determined metadata 110.

Figure 3:
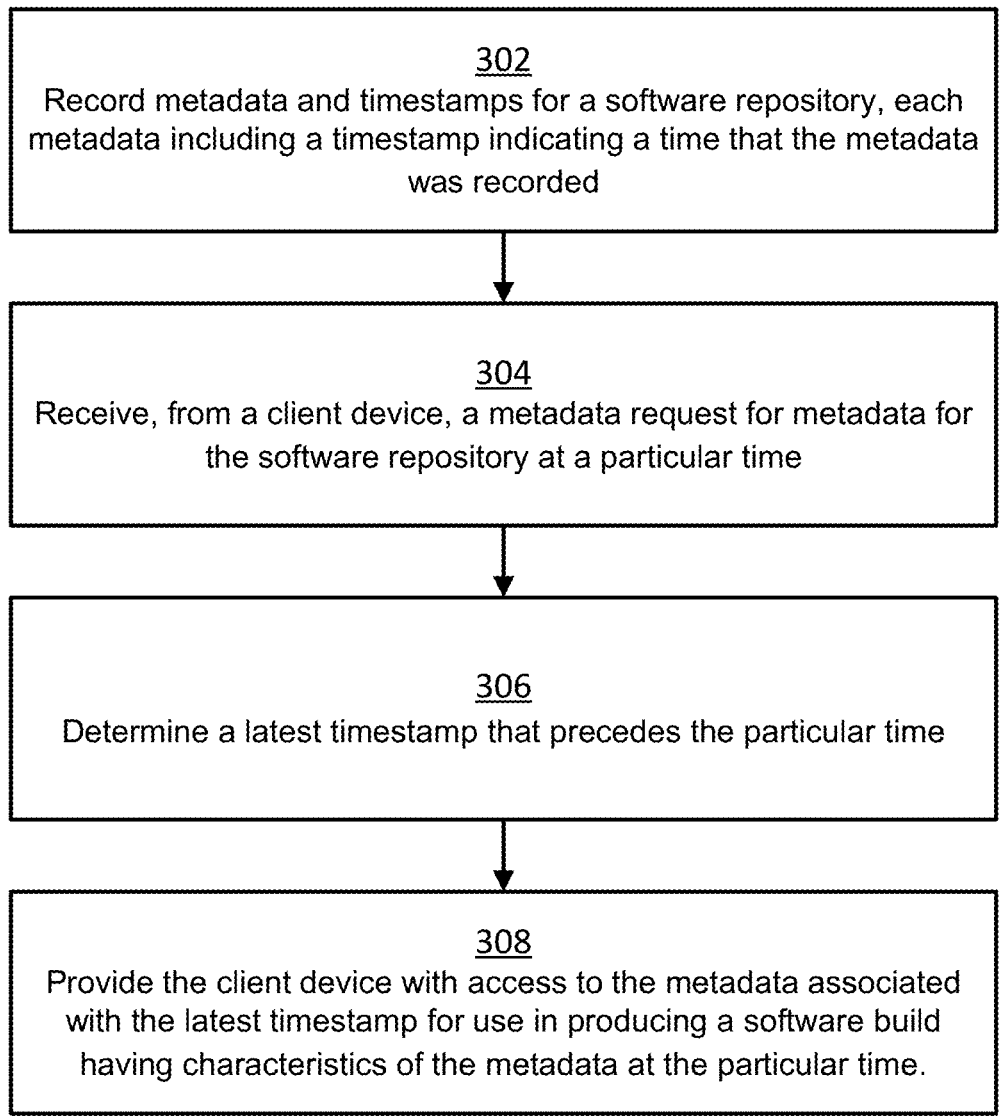
FIG. 3 is a flow chart of an example of a process for providing access to historical metadata for a software repository according to some aspects of the present disclosure.

In some examples, the processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIGS. 1-2.

At block 302, the processor 202 can record metadata 110 for a software repository 102 at multiple times. Each metadata 110 can include a timestamp 112 indicating a time that the metadata was recorded. The metadata 110 may be a snapshot of metadata 104 stored in the software repository 102 at various points in time. For example, a software build 120 may be generated using packages stored in the software repository 102. The software build 120 may be used, such as by the client device 114, to generate edge images that are then shipped to remote locations. The processor 202 may record a first metadata 110a of the software repository 102 used to generate a first edge image at a first time, represented by a first timestamp 112a. For example, the processor 202 may store the first metadata 110a and the first timestamp 112a to a metadata database 208, such as a relational database or a Git database. One day later, a package in the software build 120 may be updated, and in response to the update, the processor 202 may record a second metadata 110b with a second timestamp 112b to the metadata database 208. On a subsequent day, the processor 202 may record a third metadata 110c at a third timestamp 112c as part of a predetermined weekly recording interval.

At block 304, the processor 202 can receive, from a client device 114, a metadata request 118 for metadata 110 for the software repository 102 at a particular time 117. In some examples, the metadata request 118 may be received in response to an issue with a software build 120. For example, the edge image generated using the software build 120 may fail to boot for an unknown reason. To determine the source of the failed boot, the metadata request 118 sent by the client device 114 may request metadata 110 for the particular time 117 that the edge image was generated. Additionally, the metadata request 118 may include a repository identification 119 for identifying a particular software repository 102 storing packages for the software build 120 that generated the edge image.

At block 306, the processor 202 can determine a latest timestamp 112 that precedes the particular time 117. Because the processor 202 may be recording metadata 110 for multiple software repositories 102 in multiple metadata databases 208, the processor 202 may first identify which software repository 102 is associated with the repository identification 119 provided by the client device 114. The processor 202 may then identify a particular metadata database 208 that recorded metadata 110 associated with the identified software repository 102.

After identifying the particular metadata database 208, the processor 202 can search the identified metadata database 208 to determine a most recently recorded metadata 110 that was recorded before the particular time 117 requested by the client device 114. Determining a most recent version of the metadata 110 can ensure an accurate representation of the status of the software build at that particular time 117. For example, the particular time 117 requested by the client device 114 may have occurred after the second timestamp 112b, but before the third timestamp 112c. Therefore, the processor 202 may determine that the first metadata 110a recorded at the second timestamp 112b is the most accurate representation of the software build 120 at the particular time 117 that the edge image was generated.

At block 308, the processor 202 can provide the client device 114 with access to the metadata 110 associated with the latest timestamp 112 for use in producing a software build 120 having characteristics of the metadata at the particular time. In this particular example, the processor 202 can provide the client device 114 with access to the second metadata 110b recorded at the second timestamp 112b. Notably, the second metadata 110 may include information regarding a version of the software build 120 that was recently updated. The client device 114 may determine, using the second metadata 110, that the edge image failed to boot because of the software package in the software repository 102 that was updated after the first metadata 110a was recorded. The client device 114 can then determine that the software package used to generate the edge image should be replaced with the older version of the software package. For example, the client device 114 may then request access to the first metadata 110a, which may include the older version of the software package used in the software build 120.

In some examples, in addition to providing access to the metadata 110, the processor 202 can additionally cause a version of the software build 120 to be generated based on the characteristics of the recorded metadata 110. In some examples, a user may wish to test multiple versions of a software build 120 to determine a source of an issue in a particular version. In another example, a user may wish to test multiple versions of a software build 120 to identify a source of a feature in a particular version. In response to sending multiple metadata requests 118, the processor 202 may provide access to multiple metadata 110, and may automatically generate versions of the software build 120 using each of the multiple metadata 110. In this way, the client device 114 can determine the version of the software build 120 that is the source of the issue or the feature.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A system comprising:
a processor; and
a memory including instructions that are executable by the processor for causing the processor to:
record, by a first application programming interface, a plurality of metadata and a plurality of timestamps for a software repository, each metadata of the plurality of metadata comprising a timestamp of the plurality of timestamps indicating a time that the metadata was recorded;
receive, from a client device, a metadata request for requesting metadata that was stored in the software repository at a particular time, the metadata indicating a software package installed as part of a software build at the particular time;
determine, by the first application programming interface, a latest timestamp of the plurality of timestamps that precedes the particular time;
provide the client device with access to the metadata associated with the latest timestamp for use in producing another software build having characteristics of the metadata stored in the software repository at the particular time; and
in response to determining the latest timestamp, build the other software build according to the metadata associated with the latest timestamp.

2. The system of claim 1, wherein the metadata request is received by a second application programming interface, and wherein the memory further comprises instructions for causing the processor to provide the client device with access to the metadata associated with the latest timestamp by:
transmitting, by the second application programming interface, the metadata request to the first application programming interface;
in response to determining the latest timestamp, transmitting, by the first application programming interface, the metadata associated with the latest timestamp to the second application programming interface; and
transmitting, by the second application programming interface, the metadata associated with the latest timestamp to the client device.

3. The system of claim 1, wherein the plurality of metadata is stored in a relational database or a Git repository.

4. The system of claim 1, wherein recording the plurality of metadata further comprises recording a plurality of metadata from a plurality of software repositories.

5. The system of claim 4, wherein the metadata request comprises a repository identification associated with a particular software repository of the plurality of software repositories, and wherein the memory further comprises instructions for causing the processor to determine the latest timestamp by:
determining, by the first application programming interface, a software repository of the plurality of software repositories associated with the repository identification.

6. The system of claim 1, wherein the memory further comprises instructions executable by the processor for causing the processor to record the plurality of metadata in response to detecting a change to the software repository.

7. The system of claim 1, wherein the metadata further indicates at least one of a software installation order, a version of the software package, or software dependencies used in building the software build at the particular time.

8. A method comprising:
record, by a first application programming interface executed by a processor, a plurality of metadata and a plurality of timestamps for a software repository, each metadata of the plurality of metadata including a timestamp of the plurality of timestamps indicating a time that the metadata was recorded;
receive, from a client device, a metadata request for requesting metadata that was stored in for the software repository at a particular time, the metadata indicating a software package installed as part of a software build at the particular time;
determine, by the first application programming interface, a latest timestamp of the plurality of timestamps that precedes the particular time;
provide, by the processor, the client device with access to the metadata associated with the latest timestamp for use in producing another software build having characteristics of the metadata stored in the software repository at the particular time; and
in response to determining the latest timestamp, build the other software build according to the metadata associated with the latest timestamp.

9. The method of claim 8, wherein the metadata request is received by a second application programming interface, and wherein providing the client device with access to the metadata associated with the latest timestamp further comprises:
transmitting, by the second application programming interface, the metadata request to the first application programming interface;
in response to determining the latest timestamp, transmitting, by the first application programming interface, the metadata associated with the latest timestamp to the second application programming interface; and
transmitting, by the second application programming interface, the metadata associated with the latest timestamp to the client device.

10. The method of claim 8, wherein the plurality of metadata is stored in a relational database or a Git repository.

11. The method of claim 8, wherein recording the plurality of metadata further comprises recording a plurality of metadata from a plurality of software repositories.

12. The method of claim 11, wherein the metadata request comprises a repository identification associated with a particular software repository of the plurality of software repositories, and wherein the method further comprises determining the latest timestamp by determining, by the first application programming interface, a software repository of the plurality of software repositories associated with the repository identification.

13. The method of claim 8, further comprising recording the plurality of metadata in response to detecting a change to the software repository.

14. The method of claim 8, wherein the metadata associated with the latest timestamp indicates a version of the software package installed as part of the software build at the particular time, and wherein building the other software build according to the metadata associated with the latest timestamp further comprises:
  building the other software build using the version of the software package indicated by the metadata associated with the latest timestamp.

15. A non-transitory computer-readable medium comprising program code that is executable by a processor for causing the processor to:
  record, by a first application programming interface, a plurality of metadata and a plurality of timestamps for a software repository at a plurality of times, each metadata of the plurality of metadata comprising a timestamp of the plurality of timestamps indicating a time that the metadata was recorded;
  receive, from a client device, a metadata request for requesting metadata that was stored in the software repository at a particular time, the metadata indicating a software package installed as part of a software build at the particular time;
  determine, by the first application programming interface, a latest timestamp of the plurality of timestamps that precedes the particular time;
  provide the client device with access to the metadata associated with the latest timestamp for use in producing another software build having characteristics of the metadata stored in the software repository at the particular time; and
  in response to determining the latest timestamp, build the other software build according to the metadata associated with the latest timestamp.

16. The non-transitory computer-readable medium of claim 15, wherein the metadata request is received by a second application programming interface, and wherein the program code is further executable by the processor for causing the processor to provide the client device with access to the metadata associated with the latest timestamp by:
  transmitting, by the second application programming interface, the metadata request to the first application programming interface;
  in response to determining the latest timestamp, transmitting, by the first application programming interface, the metadata associated with the latest timestamp to the second application programming interface; and
  transmitting, by the second application programming interface, the metadata associated with the latest timestamp to the client device.

17. The non-transitory computer-readable medium of claim 15, wherein the plurality of metadata is stored in a relational database or a Git repository.

18. The non-transitory computer-readable medium of claim 15, wherein recording the plurality of metadata further comprises recording a plurality of metadata from a plurality of software repositories.

19. The non-transitory computer-readable medium of claim 18, wherein the metadata request comprises a repository identification associated with a particular software repository of the plurality of software repositories, and wherein the program code is further executable by the processor for causing the processor to determine the latest timestamp by:
  determining, by the first application programming interface, a software repository of the plurality of software repositories associated with the repository identification.

20. The non-transitory computer-readable medium of claim 15, wherein the software repository comprises package manager files storing installation packages, wherein the metadata associated with the latest timestamp indicates a particular installation package used to build the software build at the latest timestamp, and wherein the non-transitory computer-readable medium is further executable by the processor for causing the processor to build the other software build by:
  building the other software build by installing the particular installation package, wherein the other software build replicates the software build at the latest timestamp.

* * * * *